March 9, 1943.  D. S. RENNER  2,313,091
SEISMIC RECORDING
Filed Dec. 26, 1939    3 Sheets-Sheet 1

DARWIN S. RENNER
INVENTOR.
BY
Attorneys.

March 9, 1943.  D. S. RENNER  2,313,091
SEISMIC RECORDING
Filed Dec. 26, 1939  3 Sheets-Sheet 2
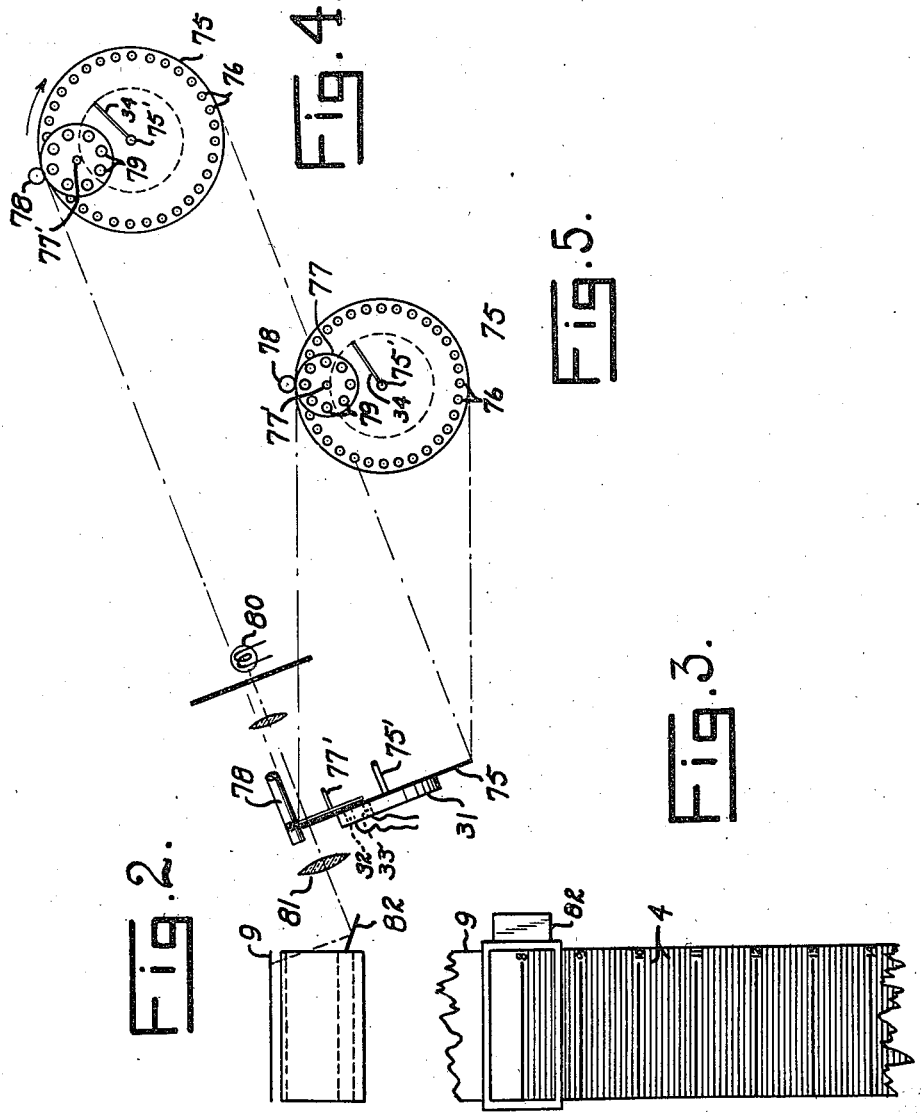
DARWIN S. RENNER
INVENTOR.
BY Jesse R. Stone
Lester B. Clark
Attorneys.

Patented Mar. 9, 1943

2,313,091

UNITED STATES PATENT OFFICE 2,313,091

SEISMIC RECORDING

Darwin S. Renner, Dallas, Tex., assignor to Geophysical Service Incorporated, a corporation of Delaware Application December 26, 1939, Serial No. 310,978

8 Claims. (Cl. 181—0.5)

This invention relates to improvements in timing in an oscillograph recording with reference chiefly to the seismic method of geophysical prospecting, altho the invention is not confined to this specific use.

In the seismic method of prospecting the practice of recording the respective phases of the seismic event has been to produce a record on a moving strip or tape of the instant of the generating impulse, followed by a plurality of side-by-side traces of the seismic waves which are received at a plurality of points spaced from each other and from the point of initiation of the seismic impulse. The recording camera is so constructed that the record is marked off in time intervals, the timing lines being spaced at $\frac{1}{100}$ second intervals and every tenth line being modified whereby $\frac{1}{10}$ second intervals are readily determined.

In this practice the completed record is manually given numerical delineations, that is the lines are counted and marked with pen and ink. In cases where the zero mark, or the instant of creation of the seismic disturbance, as by the detonation of an explosive charge in the earth, does not fall upon a timing line, a small time increment must be read to the zero timing line and this timing increment will enter into every reading taken from the record. This procedure is laborious and time consuming and offers possibility for error.

The present invention contemplates method and apparatus whereby there is produced an oscillographic record of a vibratory event, which record includes the exact timing from zero or the initiation of the event and which also includes a numerical chart from that instant, or any other predetermined instant, so that manual delineation of the timing lines is unnecessary.

It is the primary object of the invention to provide method and apparatus whereby there is provided an oscillographic record of a vibratory event, such record including a numerical scale beginning at a predetermined instant relative to any of the respective phases of the event.

Another object is to provide, in addition to the usual timing lines on an oscillographic record, a numerical chart beginning at any desired predetermined instant.

Another object is to provide a recording device which includes synchronized mechanism for producing a numerical timing chart upon the recording tape.

Still another object is to provide a seismic prospecting system whereby the operation of the recording mechanism is coordinated with the creation of the seismic impulse so that the timing record is directly related to the initiation of the seismic event.

Further objects together with the foregoing objects will become apparent from the following description of an embodiment of the invention, such description being taken in connection with the drawings in which:

Fig. 2 is a diagrammatic view which illustrates one type of mechanism for producing a numerical chart upon the recording tape of an oscilligraph;

Fig. 3 is a plan view of a recording strip showing the timing lines and numerical chart thereon;

Fig. 4 is a side view taken at right angles to the cooperating elements of the chart producing mechanism of Fig. 2;

Fig. 5 is similar to Fig. 4 but taken on a horizontal line thru chart recording elements;

Figure 6:
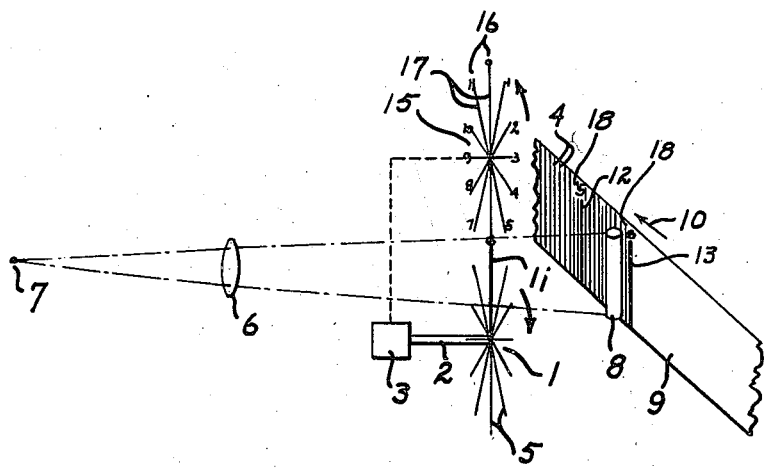
Fig. 6 is a diagrammatic view which illustrates another form of mechanism for producing timing lines and chart numerals.
Figure 7:
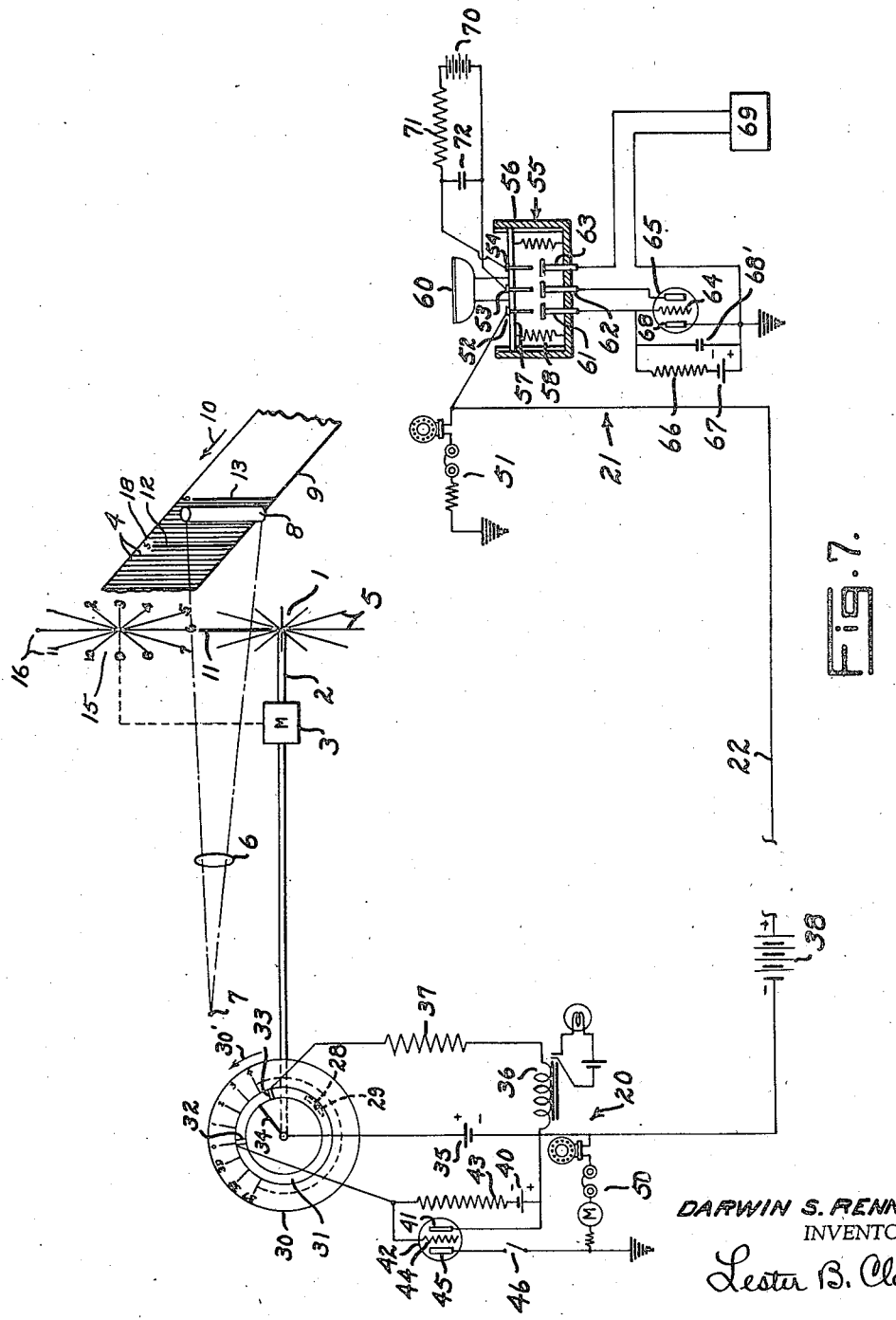
Fig. 7 is a composite diagrammatic illustration showing the cooperative relationship of the component parts of the system of the invention.

Referring first to Figs. 6 and 7 of the drawings there is shown a timing member 1 upon shaft 2 driven at a timed speed as by a constant speed motor 3. This arrangement has above been referred to as previously used to produce timing lines 4 by the passage of spokes or radial bars 5 thru a beam of light which passes thru lens 6 from the light source 7. The cylindrical lens 8 causes the shadows of the spokes 5 to be cast in sharp outline upon a sensitized strip or tape 9 moved at a uniform speed in the direction of the arrow 10. The member 1 is provided with any suitable number of spokes and is shown by way of illustration as having twelve spokes of which the spoke identified by the reference character 11 is larger than the remainder so that the interval between the lines 12 and 13 on the chart 9 represents $\frac{1}{10}$ second, which is divided into $\frac{1}{120}$ second intervals by the remaining spokes which produce the lines 4.

The present invention contemplates the additional use of a second rotating member 15 which is driven in synchronism with the member 1 so that the numerals 16 attached to the ends of the spokes 17 move successively into position at the end of the spoke 11 which is foreshortened so that the shadow of the numerals successively produce the numerals 18 upon the moving strip 9. It is understood of course that the ratio of rotation of the wheels 15 and 1 is 1/n where n is the number of spokes in the wheel 15.

Figure 1:
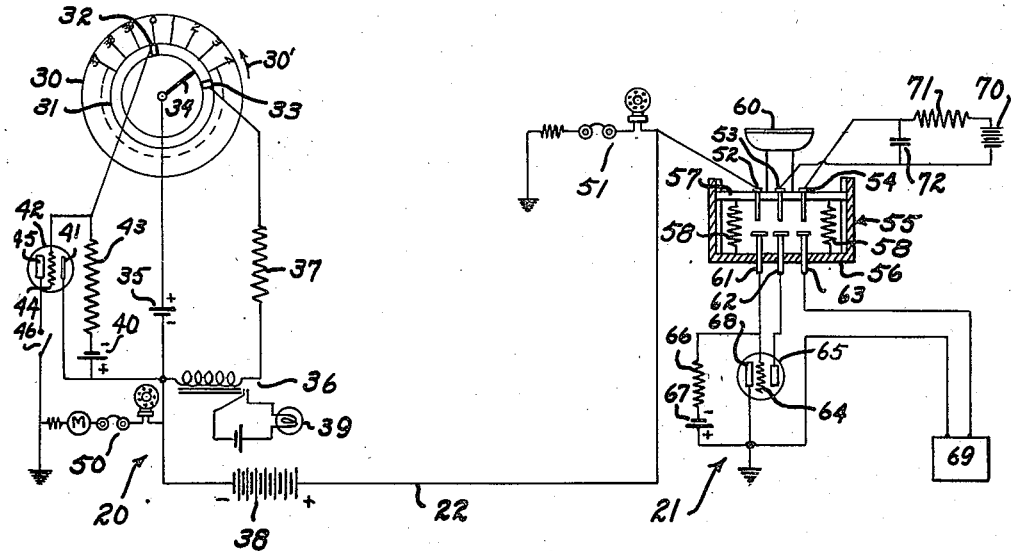
Fig. 1 is a diagrammatic illustration of a system constituting an illustrative embodiment of the invention.

In order that the timing lines 4, 12 and 13 shall have a definite relation with the respective phases of the event recorded upon the tape 9, a system such as that shown in Figs. 1 and 7 is provided. This system comprises a recording station 20 and a shot point station 21, such stations being interconnected as by a conductive line 22.

The recording station 20 comprises a timing mechanism of the type just described and includes a number bearing wheel 30 adjacent which is a commutator 31 mounted upon a suitable support to which it is secured as by a screw 28 and slot 29 connection as shown in Fig. 7. The commutator 31 has angularly spaced contacts 32 and 33 which are adapted to be engaged by a brush 34 rotating with the wheel 30. This wheel is shown as provided with forty spokes so that the numerical chart will be continuous for four seconds, a sufficient time for recording most phases of a seismic event in geophysical prospecting.

The brush 34 is connected to the positive terminal of a battery 35 of which the opposite terminal is connected thru relay 36 and resistor 37 to the contact 33 on the commutator. The negative terminal of the battery 35 is also connected to the negative terminal of a battery 38 in the line 22, to the positive terminal of a biasing battery 40 and to the cathode 41 of a thermionic relay 42. The resistor 43 is connected to the negative terminal of the battery 40 and has its opposite end attached to the grid 44 of the relay 42 and to the contact 32 on the commutator 31. The plate 45 is grounded thru a manually operable switch 46.

To provide telephonic communication between stations 20 and 21, telephone equipment generally referred to as 50 and 51 is provided, the earth being utilized as a return line.

At the station 21 the line 22 is also connected to one of three terminals 52, 53 and 54 of a manually operable switch 55 comprising a housing 56 within which a movable assembly 57 is normally arranged upwardly by means of compression springs 58. The assembly 57 may hence be manually forced downwardly by means of force applied to the handle 60 to bring the terminals 52, 53 and 54 into engagement respectively with stationary contacts 61, 62 and 63 within the housing 56.

The contact 61 is conductively connected to the grid 64 of a thermionic relay 65 and to one terminal of a resistor 66, thence to a battery 67 of which the positive terminal has a common connection to ground, plate 68 of the relay 65, and one terminal of the explosive mechanism 69. The other terminal of the explosive mechanism is connected to the stationary contact 63 of the switch 55.

A battery 70 is used as a source of energy for setting off the cap for the explosive 69. This battery is connected thru a resistor 71 to the contacts 53 and 54 of the switch 55, a capacitance 72 shunting the circuit thus formed.

In the operation of the construction thus far described the operators are mutually advised that the equipment is ready for operation. The switch 55 is then held closed by pressure applied to the handle 60. The motor 3 driving the timing wheels is placed in operation and the brush 34, also driven by the motor, engages the contact 33. This closes a circuit from the battery 35 thru the energizing coil of the relay 36 whereby the pilot lamp 39 is lighted.

As soon as the pilot lamp 39 is lighted the operator at station 20 closes the switch 46 and at the same time initiates operation of the tape driving mechanism. Hence as the brush 34 approaches contact 32 during its rotation indicated by the arrow 30', all parts of the recording mechanism are in operation.

The thermionic relays 42 and 65 may be ordinary vacuum tubes biased beyond cut-off by the batteries 40 and 67 or may be any of a number of gas tubes which are rendered non-conducting by a proper grid or control potential. The relay 65 performs the same function as relay 42 but must be capable of conducting sufficient current to set off the cap for the explosive 69.

When the brush 34 engages the contact 32 the grid 44 becomes sufficiently positive for conduction and the resulting plate current which flows from the battery 38 thru the line 22, the switch 55 and the resistor 66 similarly affects the relay 65, whereupon the charge on the condenser 72 is instrumental in setting off the explosive 69. The condenser 72 then recharges thru the resistor 71 but the constants of the system are so related that only a single impulse is produced while the brush 34 passes over the contact 32. This condition may be assured by providing a capacitance 68' between the grid and ground as shown in Fig. 7 and such added element may be found necessary if the relay 42 is a gas filled tube.

The commutator 31 is angularly adjustable as already indicated so that the instant at which the seismic impulse begins can be accurately set at zero for the area under observation and in this manner it is unnecessary when reading the record to make any compensation for an increment of time between the creation of a seismic impulse and the beginning of a timing chart on the tape 9.

A modified construction for providing the numerical chart together with the timing lines on the recording strip 9 is shown in Figs. 2 to 5. In this construction a timing wheel such as that shown at 1 in Fig. 6 is used and is supplemented by a mechanism for applying the number characters on the record. This mechanism comprises a character wheel 75 mounted on shaft 75' and having openings 76 in which are mounted transparencies bearing the desired numerals.

The wheel 75 is driven at a constant peripheral speed, together with a shutter wheel 77, mounted on shaft 77' by means of the shaft 78 driven by any suitable source. Hence at desired intervals the openings 79 in the shutter wheel come into mating relation with the openings 76 of the character wheel so that a light beam from a lamp 80 is permitted to pass thru the lens 81 and impinge upon a reflector 82 to reflect the image of the character upon the tape 9 whereby the desired numerical chart is formed.

It is believed apparent that numerous departures may be made from the specific construction and technique above described. For example the invention is not confined to the use of the brush and contact arrangement 31 to 34 but may, if desired utilize known expediencies such as the photo-electric cell for carrying out the desired functions.

Broadly the invention comprehends method and apparatus for providing oscillographic records having timing lines and a numerical chart, there being a definite relation of the chart with the predetermined phase of the recorded vibratory event.

What is claimed is:

1. In the art of seismic prospecting the method comprising the steps of, creating elastic waves in the earth, recording the instant of creation of the waves and the waves transmitted through the earth to a point in spaced relation with the wave source, and simultaneously recording a numerical chart of time of the seismic event such chart having a predetermined relation with a definite phase of the event.

2. In the art of seismic prospecting the method comprising the steps of, creating elastic waves in the earth, recording the instant of creation of the waves and, in side-by-side relation, the waves transmitted through the earth to a plurality of points in spaced relation with the wave source, and simultaneously recording a numerical chart beginning at a predetermined timed relation with the initiation of the seismic waves.

3. The method of recording vibratory events comprising the steps of creating vibrations to be recorded, detecting said vibrations as transmitted to points spaced from the source, converting the detected vibrations into electrical impulses, recording said impulses, and simultaneously recording the instant of creation of the vibration and timing lines marked numerically from such instant.

4. In the art of recording the creation and transmission of elastic impulses, the method comprising the steps of creating elastic impulses to be recorded, detecting and converting the transmitted impulses into electromotive forces in sympathy with the impulses, recording the instant of creation of the impulses and the transmitted impulses, and simultaneously recording a numerical chart whereby the sequence and time relation of the series of events is determined.

5. In the art of seismic prospecting the combination of, means for creating elastic waves in the earth, means for recording the instant of creation of the waves, means for detecting and recording the waves transmitted through the earth to points in spaced relation with the waves and means for simultaneously recording a numerical chart of time of the sequence of events.

6. In the art of seismic prospecting the combination of, a source of seismic waves, means for producing a continuous record including the instant of initiation of the waves by said source and the arrival of the resulting waves at points in spaced relation with the source, and means for simultaneously producing upon said record timing lines and a numerical chart, said last mentioned means being operable at a predetermined instant relative to the sequentially recorded events.

7. Seismic prospecting apparatus comprising, a shot point station and a recording station in spaced relation, a source of elastic waves at the shot point station, and means at the recording station for energizing said source and for simultaneously recording the shot instant and producing a numerical time record from that instant.

8. Seismic prospecting apparatus comprising, shot point and recording stations in spaced relation, means for transmitting energy therebetween, a source of elastic waves at the shot point station, means for energizing said source, means for producing a record of the shot instant, and means for producing a time chart beginning at a predetermined phase of the seismic event created by the source.

DARWIN S. RENNER.